US00RE33926E

United States Patent [19]

Waldhauser

[11] E Patent Number: Re. 33,926

[45] Reissued Date of Patent: May 19, 1992

[54] SCRUBBER SQUEEGEES FOR SCRUBBING FORWARD AND BACKWARD

[75] Inventor: Steven J. A. Waldhauser, Niagara Falls, N.Y.

[73] Assignee: Tennant Company, Minneapolis, Minn.

[21] Appl. No.: 679,588

[22] Filed: Apr. 3, 1991

Related U.S. Patent Documents

Reissue of:

[64] Patent No.: 4,817,233
Issued: Apr. 4, 1989
Appl. No.: 185,064
Filed: Apr. 22, 1988

[51] Int. Cl.[5] ..... A47L 11/202

[52] U.S. Cl. ..... 15/320; 15/322; 15/364; 15/401

[58] Field of Search ..... 15/321, 322, 330, 364, 15/401

[56] References Cited

U.S. PATENT DOCUMENTS

| | | | |
|---|---|---|---|
| 965,315 | 7/1910 | Moorhead | 15/401 X |
| 1,975,380 | 10/1934 | Streich et al. | 15/320 |
| 2,292,435 | 8/1942 | Crites | 15/401 X |
| 2,553,034 | 5/1951 | Bridge | 15/401 X |
| 2,731,659 | 1/1956 | Coplen | 15/320 |
| 2,989,769 | 6/1961 | Houser | 15/353 |
| 3,019,462 | 2/1962 | Nash | 15/1.7 |
| 3,206,787 | 9/1965 | Daniels | 15/320 |
| 3,747,155 | 7/1973 | Koellisch | 15/322 |
| 3,992,747 | 11/1976 | Hufton | 15/401 X |
| 4,164,055 | 8/1979 | Townsend | 15/321 |

FOREIGN PATENT DOCUMENTS

| | | | |
|---|---|---|---|
| 2078496 | 1/1982 | United Kingdom | 15/322 |

*Primary Examiner*—Chris K. Moore
*Attorney, Agent, or Firm*—Kinzer, Plyer, Dorn, McEachran & Jambor

[57] ABSTRACT

This is an improvement for a powered floor scrubber which in use is moved forward and backward across a floor to be scrubbed. A scrub brush is rotated within a housing which is open at the bottom and water is supplied within the housing. The improvement consists of attaching double lipped suction squeegees at both the front and rear of the housing and connecting them both to a source of vacuum to suck up soiled water from the floor. The flexible squeegee lips are mounted in such a way that as the machine is moved forward the lips of the front squeegee fold together and shut off the airflow to it while the rear squeegee remains functional. When the machine is moved backward a reverse action of the squeegees occurs, so that there is always a functional squeegee sucking up soiled water behind the scrub brush while airflow to the opposite squeegee is shut off whether the machine is moving forward or backward.

14 Claims, 2 Drawing Sheets

Fig. 1.
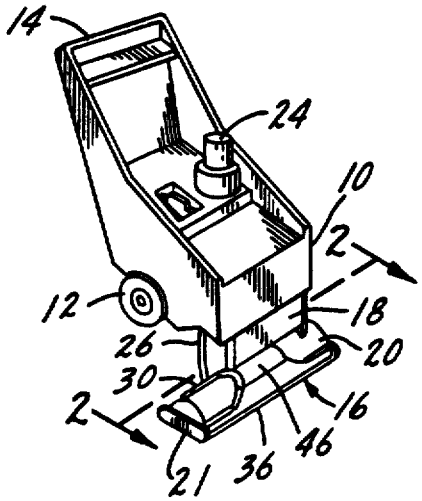
Fig. 5.
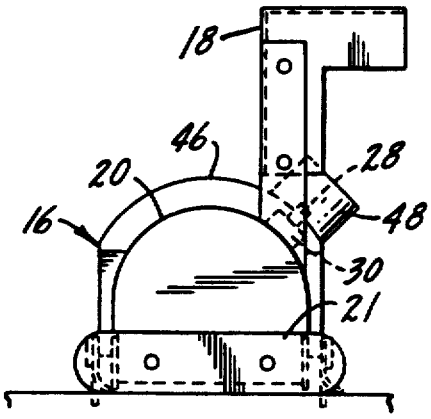
Fig. 2.
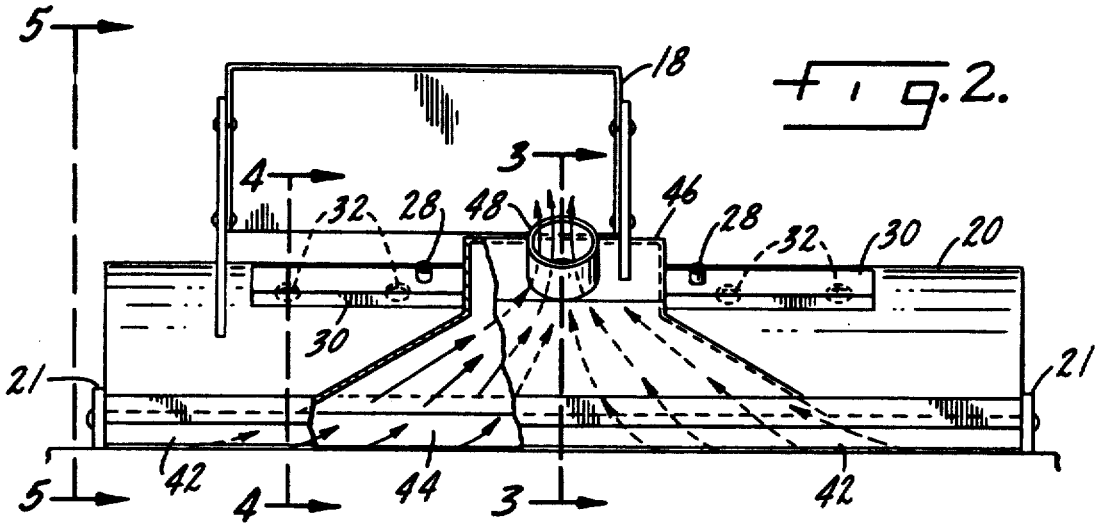
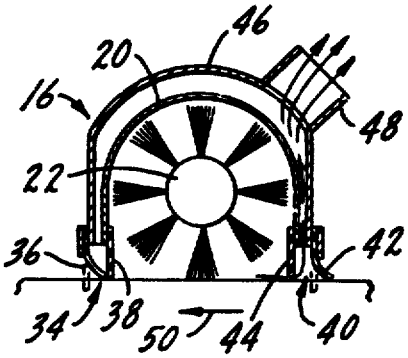
Fig. 3.
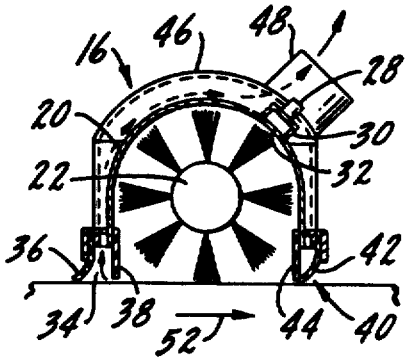
Fig. 4.

Fig. 6.
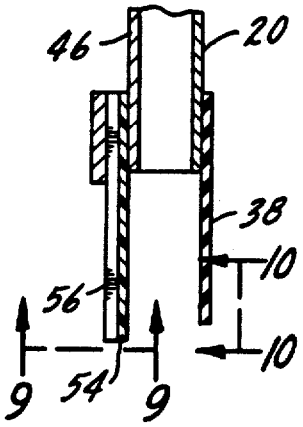
Fig. 7.
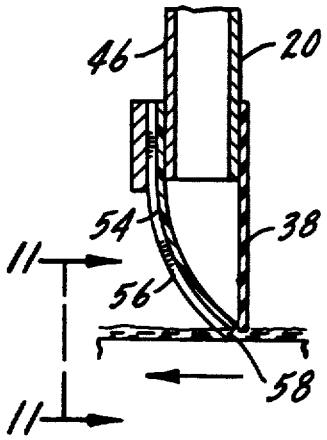
Fig. 8.
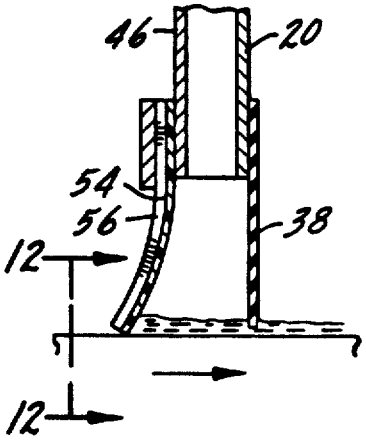
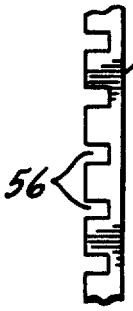
Fig. 9.
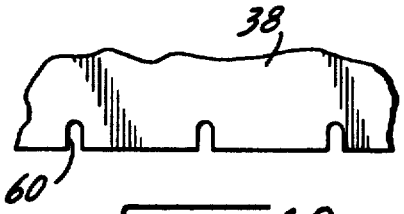
Fig. 10.
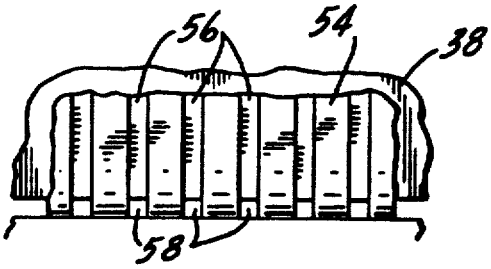
Fig. 11.
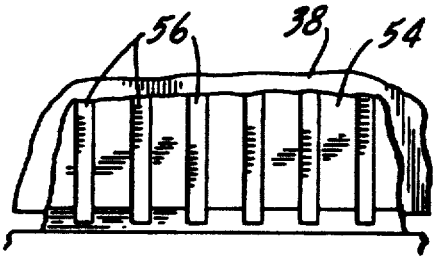
Fig. 12.

SCRUBBER SQUEEGEES FOR SCRUBBING FORWARD AND BACKWARD

Matter enclosed in heavy brackets [ ] appears in the original patent but forms no part of this reissue specification; matter printed in italics indicates the additions made by reissue.

*This is a reissue of U.S. Pat. No. 4,817,233 issued Apr. 4, 1989.*

BACKGROUND OF THE INVENTION

Floor scrubbers are sometimes used on floors which are so badly soiled that one pass with the scrubber is not enough to get the floor clean, and several passes are needed to do a good job. In restricted areas the most convenient way to do this would often be to move the scrubber forward and backward over the coiled floor. However, this has not been feasible with a conventional scrubber because the suction squeegee which is mounted behind the scrub brush to suck up dirty water in normal forward moving operation is on the wrong side of the brush to work when the machine is moved backward. Dirty water would flow out in front of the brush housing and made a mess on the floor. In addition, the rear squeegee could be damaged by being dragged backward.

Scrubbing only in forward movement is not always the best way. In smaller establishments, for example fast food outlets and small retail shops, space is often so constricted that it is awkward to turn a scrubber around. Also, the scrubber can not scrub completely into the corners of a room, and they must be scrubbed manually or not at all. In such places it would often be more effective and convenient to move a scrubber back and forth, and not have to turn it around. This would simplify scrubbing in spaces such as narrow aisles and passageways. It would also make it possible to scrub completely into a corner and then back out while scrubbing in both directions, thus doing a better job than could be done with a scrubber that only works while moving in a forward direction.

Suction squeegees are commonly used on scrubbers to remove dirty water from the floor. They commonly are comprised of two flexible rubber strips or lips dragging on the floor, one ahead of the other, with the space between them connected by a flexible tube to a vacuumized tank which collects the dirty water. The tank is vacuumized by a suction blower driven by a motor and exhausting air to the atmosphere. Air is pulled under the front squeegee lip into the space between the lips, where it entrains dirty water and carries it up the tube into the tank. The water drops into the tank and the air is exhausted by the suction blower to atmosphere. Substantial power is required to run the blower, so much that it is a major concern in designing a scrubber. The system is designed to minimize air requirements, and certainly it would be intolerable to have more than one squeegee pulling air.

SUMMARY OF THE INVENTION

The present invention overcomes the shortcomings of previous scrubbers and makes it possible to build a scrubber that can be operated forward and backward. It does this by providing a suction squeegee behind the scrub brush and another one in front of the brush, with both squeegees being connected to a vacuumized collection tank. These are double lipped squeegees that suck up dirty water in the conventional way, but they have an additional capability not found in conventional squeegees. When the machine is moved forward the front squeegee acts like an air valve and shuts off the airflow to that squeegee, so that all the available airflow is directed to the rear squeegee, which is picking up dirty water behind the scrub brush. When the machine is moved backward the rear squeegee valves shut and shuts off airflow there, while the front squeegee returns to an open condition. The entire available airflow then moves through the front squeegee, and it operates to pick up the dirty water which is now being left in front of the brush as the machine is moved backward. This configuration of squeegees permits scrubbing while the scrubber is moving forward or backward, which is a significant improvement in the field of powered floor scrubbers.

Another object or feature is a scrubber that will squeegee up existing liquid on the surface, such as in a liquid spill or a double scrub operation, when the scrubber is traveling either forward or backward. In the present arrangement this is accomplished by allowing the liquid to pass under the leading squeegee so that the trailing squeegee may pick up. This is accomplished by using on both squeegees a corrugated blade as the outer squeegee blade which allows liquid to pass under it in one direction but acts as a squeegee in the other.

BRIEF DESCRIPTION OF THE DRAWINGS

FIG. 1 is a perspective view looking at the front of a power scrubber equipped with the present invention;

FIG. 2 is a rear view of the scrub head of the scrubber of FIG. 1, as seen from view line 2—2 in FIG. 1 on an enlarged scale, with a portion of the exterior surface broken away to show the interior of the air plenum chamber;

FIG. 3 is a cross section through the scrub head, taken along section line 3—3 in FIG. 2;

FIG. 4 is a cross section through the scrub head, taken along section line 4—4 in FIG. 2, FIG. 5 is a view of the left end of the scrub head, taken along view line 5—5 in FIG. 2, FIG. 6 is an enlarged cross section of a squeegee of the invention in an inoperative position, FIG. 7 is like FIG. 6 but in an operative position, FIG. 8 is like FIG. 6 but in a different operative position, FIG. 9 is a partial edge view of the outer lip of FIGS. 6–8 taken from view line 9—9 in FIG. 6, FIG. 10 is a partial plan view of the inner lip of FIGS. 6–8 taken from view line 10—10 in FIG. 6, FIG. 11 is a view along line 11—11 of FIG. 7, and FIG. 12 is a view along line 12—12 of FIG. 8.

DETAILED DESCRIPTION OF THE PREFERRED EMBODIMENT

FIG. 1 shows a power scrubber which is equipped with the present invention. It is shown as a relatively small scrubber, adapted for scrubbing small commercial establishments such as, for example, fast food outlets and small retail shops. It has a body 10 which is preferably made of molded plastic, but could be otherwise, such as for example, welded stainless steel. It is supported by a pair of free rolling wheels 12, and is moved by an operator who grasps handlebar 14, there being no powered propulsion drive. There is a scrub head 16 attached to the body by a mounting bracket 18. This bracket is shown in FIGS. 1, 2 and 5, but for clarity is omitted from FIGS. 3 and 4. The scrub head has a housing 20. On both ends of the housing there are skids 21 made of a low friction rigid plastic material, which slide on the floor and support the weight of the forward part of the machine. They also serve as skirts to close in the ends of the scrub head and contain water within it. Mounted within the housing there is a cylindrical scrub brush 22, shown in FIGS. 3 and 4. In use this brush is caused to rotate by an electric motor, not shown but located behind the mounting bracket 18 in FIG. 1, and a drive belt at one end of the housing. These features are entirely conventional, according to the usual practice in manufacturing power floor scrubbers, so will not be described here.

The brush drive motor and suction air blower 24 in FIG. 1 may be powered either by batteries carried on body 10 or by a power cord plugged into a wall outlet. Suitable control switches, although not shown, are located below handlebar 14, within convenient reach of an operator walking behind the machine.

Within body 10 there is also a supply tank for storing clean water or cleaning solution. Flow out of this tank is controlled by valve which can be set by the operator. From the valve two flexible tubes, one of which is shown at 26 in FIG. 1, lead down to the scrub head, where they connect to stub tubes 28. These feed into two manifolds 30, each of which has several holes 32 opening into the interior of the brush housing, so that cleaning solution can flow onto the brush and thence down to the floor.

Body 10 also houses a tank for recovering and storing dirty scrub water. Suction air blower 24 is mounted on top of and operatively connected to this tank so that it evacuates air from the tank and exhausts it to the atmosphere. The tank is connected by a flexible tube to the squeegees on the floor, and the vacuum in the tank creates a suction through the tube to the squeegees which pick up dirty water from the floor and deposits it in the recovery tank. Everything thus far described is quite conventional except for the presence of two squeegees.

There is a front squeegee 34 which has an outer lip 36 and an inner lip 38, and there is a rear squeegee 40 which has an outer lip 42 and an inner lip 44. These lips are made of a flexible rubber-like material, which may be similar to that used in other squeegees, and they extend along the length of the housing 20 and are attached to it. The inner lips 38 and 44 are attached to the housing in such a way that they extend down almost to the floor, possibly touching it at times. The outer lips 36 and 42 are wider that the inner lips, so that they extend down to the floor and their lower edges are caused to flex somewhat by the floor, as shown in FIGS. 3 and 4. The unflexed widths of these lips are shown in dotted outline in FIG. 3, but the flexed or curved profile is the normal condition when in contact with a floor. The width of these outer lips is made such that when they flex inwardly toward the inner lips, the outer lips will just touch the inner lips. If they are made wider than that the outer lip will get squeezed under the inner lip, which increases the friction of that outer lip with the floor and makes the machine harder to push. A good air seal can be obtained if the outer lips just touch the inner lips, and more width on the outer lips is not needed.

There is a plenum chamber 46 which connects the spaces between the inner and outer lips of both squeegees with a stub tube 48 to which is attached the flexible tube leading to the recovery tank in body 10. Thus the vacuum created in the recovery tank by vacuum blower 24 is conveyed to the spaces between the inner and outer lips of both the front and rear squeegees.

The rigid plastic skids 21 on the ends of the housing act to close off the ends of the squeegees against airflow so air will be pulled in under the inner lips. Other methods of closing off the squeegee ends could be used, as anyone familiar with scrubbers will recognize.

The use, operation and function of the invention are as follows. To use the scrubber, the operator will turn on the scrub brush and the suction blower and open the water supply valve as needed. He or she will then start pushing and pulling the scrubber forward and backward across the floor to be scrubbed.

When the motion is forward as indicated by arrow 50 in FIG. 3 the squeegees will assume the positions shown in FIG. 3. The outer lip 36 of the front squeegee will be bent back by its contact with the floor until it touches inner lip 38. This will shut off airflow through this squeegee. At the same time the outer lip 42 of the rear squeegee will also be bent back because of contact with the floor. This will open the space between it and inner lip 44. Air will be pulled under inner lip 44, where it will entrain dirty scrub water and carry it into the space between the lips, up through the plenum chamber 46, and out through connection 48 to the recovery tank. This flow path of air and entrained water is shown by arrows in FIGS. 2 and 3.

When the scrubber motion is backward as indicated by arrow 52 in FIG. 4, the squeegees will assume the positions shown in FIG. 4. The outer lip 42 of the rear squeegee, due to its contact with the floor, will be bent toward the inner lip 44 until they touch, which will shut off airflow through the rear squeegee. The outer lip 36 of the front squeegee will be bent away from the inner lip 38, thus opening the front squeegee for airflow. Air will enter under lip 38, entraining dirty water with it, and carrying it into the space between the lips, then up through the plenum chamber 46, and out through connection 48 to the recovery tank. This flow path is shown by arrows in FIG. 4.

Plenum chamber 46 extends above brush housing 20 in the center of the housing, but tapers down to the squeegees so that it is below the top of the housing for most of the housing length. The water manifolds 30 are also below the top of the brush housing, and the housing itself is fitted as closely as practicable around the scrub brush. Thus the scrub head has minimum height near its ends which facilitates scrubbing under overhanging toe spaces of store counters, restaurant tables and the like.

In FIGS. 6 through 12, variant forms have been shown in which the outer squeegee blade 54 has corrugations or channels 56, as in FIG. 9, on its outer surface so that when it is flexed inwardly as shown in FIGS. 7 and 11, spaced openings or passages are provided along the bottom edge, as at 58 in FIGS. 7 and 11. These allow some liquid to pass under the blade when moving in the direction of arrow 59 in FIG. 7 but the blade acts as a squeegee when moving in the other direction as shown by arrow 57 in FIG. 8. Thus the device, in addition to squeegeeing up the liquid that the machine applies, may also be used to squeegee up existing liquid on the floor as, for example, after a double scrub operation or to pick up accidentally spilled liquids. If desired, the inner squeegee blade 38, if it is long enough to contact the floor may be provided with notches 60, such as shown in FIG. 10 to allow some water and air flow. As shown in FIGS. 7 and 8 the inner blade does not contact the floor surface. In such an arrangement the notches 60 would not be necessary, so in that sense FIG. 10 is an alternate form of what is shown in FIGS. 6 through 8.

The total effect of the invention, therefore, is to provide a functional suction squeegee behind the scrub brush in the direction of travel, whether the scrubber is moving forward or backward, and to direct the entire available airflow to that squeegee. The operation is entirely automatic requiring no attention from the operator. Also, the valving of air from one squeegee to the other is accomplished entirely by the squeegees themselves. No additional valves or auxiliary parts are required.

The invention has been described in connection with a relatively small scrubber, but it is not limited to small scrubbers. It can as well be applied to a large industrial scrubber, as for example a machine required to scrub long aisles too narrow to turn around in, thus necessitating backing out. Also, the scrubber which has been described has a single cylindrical scrub brush. It is common practice to build scrubbers with two cylindrical brushes. The number and type of brushes used are immaterial to the invention. The squeegee arrangement which has been described would be applicable to any scrubber, regardless of its brush configuration.

While the preferred form and several variations of the invention have been shown, described and suggested it should be understood that the invention should not be restricted thereto, but that suitable additional modifications, substitutions, alterations and variations may be used.

The embodiments of the invention in which an exclusive property or privilege is claimed are defined as follows:

1. In a scrubber, a mobile frame, at least one scrub brush attached to the frame to engage and work on a surface to be cleaned, an enclosure over the brush having a defined periphery approaching and opposing the surface, means for supplying a cleaning solution to the brush, squeegees engaging the surface on the front and rear portions of the periphery of the enclosure, a vacuum chamber associated with the enclosure in communication with the squeegees and a source of vacuum, and means for communicating only the rear squeegee to the vacuum chamber when the scrubber is moving forward and communicating only the front squeegee to the vacuum chamber when the scrubber is moving to the rear.

2. The structure of claim 1 further characterized in that the communicating means automatically responds to the movement of the machine.

3. The structure of claim 2 further characterized in that the front and rear squeegees each include outer and inner elongated flexible spaced apart rubber-like blades, the bottom of the inner blade closely approaching engagement with the surface during operation, the outer blade being longer than the inner blade so that when the inner blade closely approaches engagement with the surface, the outer blade will be flexed in engagement with the surface, the differential length of the outer blade being such that it will flex toward and engage the inner blade to function as a check valve when the machine is moving in the direction of the outer blade and will flex away from and be in spaced relation to the inner blade when the machine is moving toward the inner blade.

4. The structure of claim 3 further characterized in that the squeegees are generally rectilinear and further including longitudinally disposed seals along the sides of the enclosure-engaging the ends of the squeegees and also the surface to be cleaned.

5. The structure of claim 3 further characterized in that the outer blade of each squeegee has a corrugated outer surface so that liquid on the surface will pass under the outer squeegee blade when it is flexed inwardly.

6. The structure of claim 3 further characterized in that the inner blade of each squeegee has spaced notches along its lower edge to provide for liquid flow [hen] *when* its bottom edge is in contact with the surface.

7. The structure of claim 1 further characterized in that the brush is a cylindrical brush.

8. The structure of claim 1 further characterized by and including a seal around the periphery of the enclosure engaging the surface, the squeegees being a part of the seal.

*9. In a scrubber, a mobile frame, at least one scrub brush attached to the frame to engage and work on a surface to be cleaned, an enclosure over the brush having a defined periphery approaching and opposing the surface to be cleaned, means for supplying a cleaning solution to the brush, front and rear squeegees engaging the surface on the front and rear portions of the periphery of the enclosure, a vacuum chamber associated with the enclosure in communication with the squeegees and a source of vacuum, the front and rear squeegees each including paired outer and inner elongated flexible generally parallel spaced part rubber-like blades, the blades being generally rectilinear and further including a corrugated outer surface on at least the outer blade of each pair so that liquid on the surface will pass under the outer squeegee blade when it is flexed inwardly, and means sealing the ends of the outer and inner squeegee blades in both the front and rear squeegees* to provide an enclosed compartment between *each pair of* blades.

*10. The structure of claim 9 further characterized by and including means for communicating only the rear squeegee to the vacuum chamber when the scrubber is moving forward and communicating only the front squeegee to the vacuum chamber when the scrubber is moving to the rear.*

*11. The structure of claim 10 further characterized in that the communicating means automatically responds to the movement of the machine.*

*12. The structure of claim 9 further characterized in that the bottom of the inner blade of each pair closely approaches engagement with the surface during operation, the outer blade being longer than the inner blade so that when the inner blade closely approaches engagement with the surface, the outer blade will be flexed in engagement with the surface, the differential length of the outer blade being such that it will flex toward and engage the inner blade to function as a check valve when the machine is moving in a direction in which the outer blade leads the inner blade and will flex away from and be in spaced relation to the inner blade when the machine is moving in an opposite direction in which the outer blade trails the inner blade.*

*13. The structure of claim 9 further characterized in that the inner blade of each squeegee has spaced notches along its lower edge to provide for liquid flow through the blade when its bottom edge is in contact with the surface.*

*14. The structure of claim 9 further characterized in that the brush is a cylindrical brush.*

* * * * *